(12) United States Patent
Kronawittleithner et al.

(10) Patent No.: US 8,263,206 B2
(45) Date of Patent: Sep. 11, 2012

(54) LAYERED FILM COMPOSITIONS, PACKAGES PREPARED THEREFROM, AND METHODS OF USE

(75) Inventors: Kurt Kronawittleithner, Horgen (CH); Herbert Bongartz, Einsiedeln (CH); Anne Descheemaeker, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 1034 days.

(21) Appl. No.: 11/994,535

(22) PCT Filed: Jul. 7, 2006

(86) PCT No.: PCT/US2006/026667
§ 371 (c)(1), (2), (4) Date: Jan. 3, 2008

(87) PCT Pub. No.: WO2007/008753
PCT Pub. Date: Jan. 18, 2007

(65) Prior Publication Data
US 2008/0202075 A1   Aug. 28, 2008

(51) Int. Cl.
| | |
|---|---|
| B32B 1/02 | (2006.01) |
| B32B 1/08 | (2006.01) |
| B32B 27/08 | (2006.01) |
| B32B 27/28 | (2006.01) |
| B32B 27/30 | (2006.01) |
| B32B 27/32 | (2006.01) |
| B32B 27/34 | (2006.01) |
| B32B 3/10 | (2006.01) |
| B32B 9/04 | (2006.01) |
| B32B 27/00 | (2006.01) |

(52) U.S. Cl. ..... 428/137; 428/34.1; 428/35.2; 428/35.4; 428/35.7; 428/36.5; 428/36.6; 428/36.7; 428/36.91; 428/411.1; 428/474.4; 428/475.5; 428/475.8; 428/476.1; 428/476.3; 428/476.9; 428/500; 428/515; 428/516; 428/523; 428/138

(58) Field of Classification Search ................. 428/34.1, 428/35.2, 35.4, 35.7, 36.5, 36.6, 36.7, 36.9, 428/36.91, 131–140, 411.1, 474.4, 475.5, 428/475.8, 476.1, 476.3, 476.9, 500, 515, 428/516, 523
See application file for complete search history.

(56) References Cited

U.S. PATENT DOCUMENTS
3,042,287 A   7/1962   Chandler
(Continued)

FOREIGN PATENT DOCUMENTS
DE   3145259 A1   5/1983
(Continued)

OTHER PUBLICATIONS
Wild et al., Journal of Polymer Science, Poly. Phys. Ed., vol. 20, p. 441 (1982).
(Continued)

*Primary Examiner* — Walter B Aughenbaugh

(57) ABSTRACT

The invention relates to a perforated film composition, comprising at least three layers, and wherein at least one layer is a inner layer with a softening and/or melting temperature, lower than the respective softening and/or melting temperatures of at least two outer layers, located at opposite surfaces of the inner layer, and where upon exposure to elevated temperature, the inner layer softens or melts to such an extent, that upon exposure to a compression force, a sufficient number of perforations seal in the inner layer, to impart an increased moisture barrier to the overall film composition. The invention also relates to a method of forming such a perforated film composition, packages prepared from the same, and a method of filling packages prepared from the perforated film composition.

33 Claims, 4 Drawing Sheets

U.S. PATENT DOCUMENTS

| | | |
|---|---|---|
| 3,085,608 A | 4/1963 | Mathues |
| 3,456,044 A | 7/1969 | Pahlke |
| 3,645,992 A | 2/1972 | Elston |
| 4,076,698 A | 2/1978 | Anderson et al. |
| 4,332,845 A | 6/1982 | Nawata et al. |
| 4,339,507 A | 7/1982 | Kurtz et al. |
| 4,352,849 A | 10/1982 | Mueller |
| 4,657,610 A * | 4/1987 | Komatsu et al. ............... 156/87 |
| 4,672,684 A | 6/1987 | Barnes et al. |
| 4,684,576 A | 8/1987 | Tabor et al. |
| 4,743,123 A | 5/1988 | Legters et al. |
| 4,762,890 A | 8/1988 | Strait et al. |
| 4,798,091 A | 1/1989 | Lew |
| 4,820,557 A | 4/1989 | Warren |
| 4,837,084 A | 6/1989 | Warren |
| 4,865,902 A | 9/1989 | Golike et al. |
| 4,927,708 A | 5/1990 | Herran et al. |
| 4,927,888 A | 5/1990 | Strait et al. |
| 4,952,451 A | 8/1990 | Mueller |
| 4,963,419 A | 10/1990 | Lustig et al. |
| 5,008,204 A | 4/1991 | Stehling |
| 5,055,438 A | 10/1991 | Canich |
| 5,057,475 A | 10/1991 | Canich et al. |
| 5,059,481 A | 10/1991 | Lustig et al. |
| 5,064,802 A | 11/1991 | Stevens et al. |
| 5,096,867 A | 3/1992 | Canich |
| 5,132,380 A | 7/1992 | Stevens et al. |
| 5,231,106 A | 7/1993 | Knutsen et al. |
| 5,272,236 A | 12/1993 | Lai et al. |
| 5,278,272 A | 1/1994 | Lai et al. |
| 5,288,531 A | 2/1994 | Falla et al. |
| 5,346,963 A | 9/1994 | Hughes et al. |
| 5,360,648 A | 11/1994 | Falla et al. |
| 5,374,696 A | 12/1994 | Rosen et al. |
| 5,453,410 A | 9/1995 | Kolthammer et al. |
| 5,470,993 A | 11/1995 | Devore et al. |
| 5,493,844 A | 2/1996 | Combrink et al. |
| 5,703,187 A | 12/1997 | Timmers |
| 5,721,025 A | 2/1998 | Falla et al. |
| 5,807,630 A | 9/1998 | Christie et al. |
| 5,844,045 A | 12/1998 | Kolthammer et al. |
| 5,845,995 A | 12/1998 | Starlinger Huemer et al. |
| 5,869,575 A | 2/1999 | Kolthammer et al. |
| 5,872,201 A | 2/1999 | Cheung et al. |
| 5,888,597 A | 3/1999 | Frey et al. |
| 5,891,376 A | 4/1999 | Christie et al. |
| 6,054,544 A | 4/2000 | Finlayson et al. |
| 6,117,465 A | 9/2000 | Falla et al. |
| 6,118,013 A | 9/2000 | Devore |
| 6,335,410 B1 | 1/2002 | Finlayson et al. |
| 6,448,341 B1 | 9/2002 | Kolthammer et al. |
| 6,723,398 B1 | 4/2004 | Chum et al. |
| 6,723,810 B2 | 4/2004 | Finlayson et al. |
| 2003/0179960 A1 | 9/2003 | Beaulieu |

FOREIGN PATENT DOCUMENTS

| | | |
|---|---|---|
| DE | 3832673 A1 | 4/1990 |
| EP | 0060599 | 9/1982 |
| EP | 0 193 938 | 9/1986 |
| EP | 0368632 | 5/1990 |
| EP | 0391661 | 10/1990 |
| EP | 0416815 A2 | 3/1991 |
| EP | 0500931 A1 | 9/1992 |
| EP | 0514828 A1 | 11/1992 |
| GB | 1248731 | 10/1971 |
| GB | 1265547 | 3/1972 |
| GB | 1462941 | 1/1977 |
| JP | 08026332 | 1/1996 |
| JP | 10-217405 | 8/1998 |
| JP | 2002326300 | 11/2002 |
| JP | 2004250469 | 9/2004 |
| WO | WO-2004106392 A1 | 12/2004 |

OTHER PUBLICATIONS

*The Encyclopedia of Chemical Technology*, Kirk-Othmer, Third Edition, John Wiley & Sons, New York, 1981, vol. 16, pp. 416-417.
*The Encyclopedia of Chemical Technology*, Kirk-Othmer, Third Edition, John Wiley & Sons, New York, 1981, vol. 18, pp. 191-192.
*Packaging Machinery Operation*, Chapter 8: *Form-Fill-Sealing*, by C. Glenn Davis (Packaging Machinery Manufacturers Institute, 2000 K Street, N.W., Washington, D.C. 2006).
*The Wiley Encyclopedia of Packaging Technology*, Marilyn Bakker, Editor-in-chief, pp. 364-369 (John Wiley & Sons).
*Plastic Films, Technology, and Packaging Applications* (Technomic Publishing Co., Inc. (1992)), by Kenton R. Osborn and Wilmer A Jenkens, pp. 39-105.
Williams and Ward, J. Polym. Sci., Polym. Let., 6, 621 (1968).

* cited by examiner

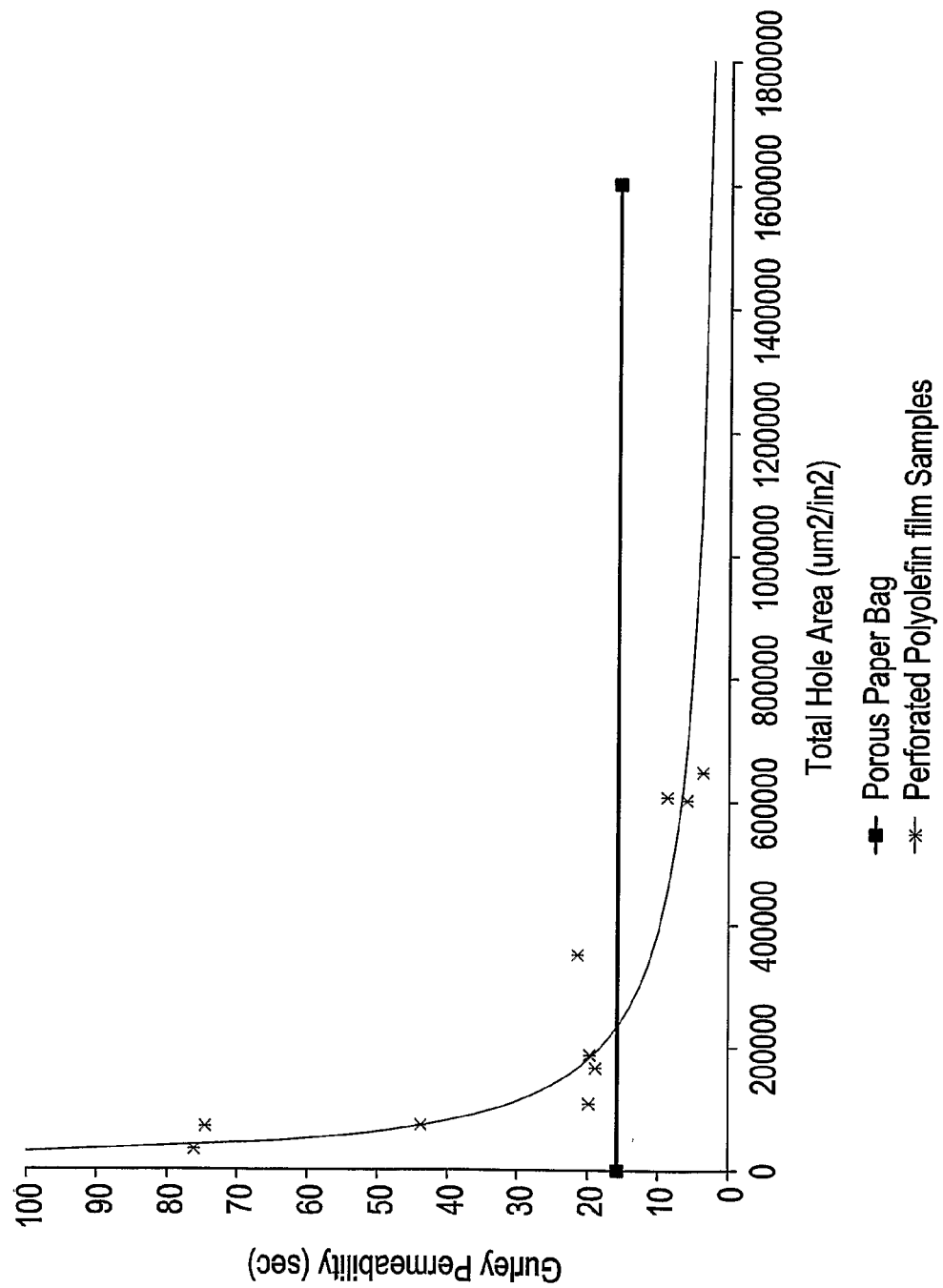

LAYERED FILM COMPOSITIONS, PACKAGES PREPARED THEREFROM, AND METHODS OF USE

REFERENCE TO PRIOR APPLICATION

This application claims the benefit of Provisional Application No. 60/697,915, filed on Jul. 8, 2005, incorporated herein, in its entirety, by reference.

BACKGROUND OF INVENTION

The invention relates to a perforated layered film composition, which, upon exposure to elevated temperature and a compression force, forms a barrier to moisture, for example, in terms of the transport of water in predominantly liquid form through the perforations of the film. The film composition may be used for various packaging, and in particular, for flexible packaging. The packages formed from the film composition can be filled effectively, under pressurized conditions, with powdery materials. The present invention also relates to packages prepared from such film compositions, to methods of forming such film compositions and such packages, and to a method of filling such a package with powdery goods.

BACKGROUND OF THE INVENTION

In the powder packaging business, it is critical to have breathable bags, as the bags are filled by pressurized air that fluidizes the powder particles. Entrained air must be removed from the bag or the internal bag pressure will increase, and the bag will rupture. Currently, entrained air is removed by perforations in plastic bags. Unfortunately perforated bags can not be transported over long time periods in a humid environment, or stored outside, with the potential for exposure to rain or high humidity. There is a need for a low cost, breathable package that can efficiently release air during the filling process, and afterwards, can prevent moisture from contacting contained goods within. In addition, such a package should be readily usable on standard packaging lines, without the need for additional processing steps, or for alterations in the original processing steps.

When designing a package for powdery goods, bulk and interstitial air, internal product load and process heat, are critical elements that should be addressed. During a filling process, air that is used to convey the powder, as it fills the package, and remaining interstitial air in the powder, must be removed. In the current packaging of powder goods, such as cement, the powder good is forced into the flexible packaging using pressurized air that fluidizes the powder particles. The entrained air must be removed from the package in a controlled manner, to allow maximum capturing of the fluidized powder.

Optimal packages should keep the powder from leaking out; however, the retainment of the powder must be balanced with the need to allow air to escape during the filling process. As discussed above, one method of air escape is to perforate the package. However, the size and number of perforations in the package will dictate the amount of powder that can leach out of the bag. Other methods used to reduce the powder dust, and allow for air escape, include a bag-in-a-bag designs, with a different perforation configuration on each bag. These designs do not prevent moisture ingress into the goods contained within the package.

Packages for powdery goods must be able to withstand the load of the contained goods, which can vary from relatively small, 1 kg packs, up to the well known, 50 kg cement bags. The load associated with 50 kg of cement can be simulated using axial stress calculations. Calculations show that even relatively thin films (~75 microns) have sufficient yield strength to withstand the axial stress associated with 50 kg. Also, the polymer of the outer or skin layer of the package must have a high enough melting point to avoid substantial melting at the filling temperatures. The issue of heat resistance will strongly influence the selection of individual resins for the film structure.

In addition, to the above factors, additional factors of concern relate to external applied forces originating from the process steps in the production plant. For example, filled packages are transported through the production plant using a series of conveyors. These conveyors may involve sloped surfaces (inclining and declining), many turns at a variety of angles, and many different surface textures (metal rollers, rubber conveyors, fabric conveyors, etc.). The filled packages must travel along these conveyors without sliding or slipping off. The stability of a package on a conveyor line will be related to the package's surface structure (including the potential coefficient of friction), as well as the internal bag pressure.

Moreover, during the palletization of the packages and the stacking of the pallets, typically, 45 bags are stacked per pallet, by an automated palletizing machine. The pallets are then stacked, as many as three pallets high, with the packages near the bottom of the stacks experiencing significant stress from the top load. In this situation, the potential for creep resistance could result in deformation of the packages near the bottom of the stack, and the release of goods.

GB 1 265 547 discloses a process for packing particulate or pulverulent products in packaging means made of plastics sheeting. This reference discloses a container made of orientated plastics sheeting, and provided with perforations having a diameter less than the mean particle size of the product, for use as a packaging means. The container is filled with the product, cleaned after having been filled, and then heated until the perforations have closed. To relieve the plastic sheeting of pressure exerted by the product, while the sheeting is being heated, an external force may be applied to the filled container, before the perforations are closed, to ensure the perforations close. The force is applied in a direction parallel to the plane formed by the perforated part of the plastic sheeting, and acts against the tensile force exerted on the perforated sheeting by the pressure of the product. U.S. Pat. No. 4,332,845 described bags, in which at least part of the material constituting the bag, and in which an oxygen absorbent is sealed, is composed of a laminated sheet, in which a gas permeable sheet is laminated to one or both sides of a microporous film to provide a lamination. The two outside layers of the lamination have different softening points, with the layer having a lower softening point constituting the inner surface of the bag. The bag can be produced at a high speed by using an ordinary heat-seal machine.

U.S. Pat. No. 4,743,123 discloses a plastic bag of polyolefin material, such as polyethylene, for packaging materials, comprising particles of less than 50 μm. This patent also discloses a closed bag containing such materials, and a foil material for such a bag. The foil wall of the bag is provided with venting apertures with smooth edges, obtained by laser radiation, and having a maximum size of 50-100 μm. The distance between the venting perforations is such that, the tensile strength of the foil is substantially the same as the tensile strength of the similar non-perforated foil. This patent also discloses bags that contain a low density polyethylene foil, and bags that contain two perforated foil layers, with staggered perforations. U.S. Pat. No. 4,672,684 discloses a thermoplastic shipping bag having a thermoplastic inner ply, comprising a mesh, which permits the packaging of finely powdered materials, without releasing unacceptable levels of powders to the atmosphere, during or after filling. The walls of the bag may contain multiple plies, and plies and mesh lining may be made of different materials. The bags can be used, without significant modification, on existing packaging systems, used to fill and process multi-wall paper shipping bags.

U.S. Pat. No. 3,085,608 discloses a plastic sheet or bag, which is permeable to air, and substantially impermeable to water, and which contains a plurality of vents in the form of minute flap valves, which are caused by perforating the material of the bag, without removing the material from the perforations. Pressure on either side of the bag causes the plurality of minute valves to open, to permit the passage of air therethrough, and the perforations are of such small magnitude, that water, for example, on the exterior of the bag does not pass through the small perforations, due to the surface tension effect. This patent also discloses a polyethylene sheet or bag, which is perforated in a more or less a regulated pattern, with a myriad of perforations, spaced a predetermined distance apart. U.S. Pat. No. 5,888,597 discloses a packaging comprising a thermoplastic film, based on a polymer containing polyamide blocks and polyether blocks. The polymer is permeable to water vapor, to ethylene, to $CO_2$ and to oxygen, and its permeability to $CO_2$ is much greater than its permeability to oxygen.

U.S. Pat. No. 5,891,376 discloses a controlled permeability film and process for producing same, wherein the film includes: a film forming polyolefin polymer; and an inert porous filler, in an amount effective, to reduce the ratio of the carbon dioxide permeability and water permeability to the oxygen permeability of the film. This patent discloses subjecting the film to a "permeability modifying step," which may include a pressure treatment, a heat treatment, a stretching treatment, or a combination thereof. Additional films are described in EP 0 500 931 A1; EP 0 391 661A; U.S. Pat. No. 5,807,630; WO 2004/106392; EP 0 060 599; EP 0 368 632; and GB 1 248 731. Reference DE 38 32 673A1 discloses the use of a nonwoven type of tube for the filling of powdery goods.

However, none of the references as discussed above, discloses a multi-layered (at least three), perforated film, in which the core and exterior layers have different thermal properties, and which are designed to form a tough bag, which will allow air to escape during a filling process, and which can be heat and compression treated to form an improved moisture barrier to prevent the ingress of bulk moisture into the contained goods, without impairing the structural integrity of the bag.

Thus, there is a need for perforated, moisture-resistant packages that will allow air to escape during the filling process, and afterwards, form an improved moisture barrier against the transport of water through perforations. In addition, there is a need for a package that can maintain structural integrity at elevated temperatures and under applied stresses during the packaging process, and during storage. These and other issues have been satisfied by the following invention.

SUMMARY OF THE INVENTION

The invention provides for a breathable (perforated), layered package that can be filled effectively, under pressurized conditions, with powdery materials, and which, upon exposure to elevated temperature and a compression force, forms a barrier to moisture. The package is formed from a perforated, multilayered film composition that is breathable during the filling of the powdery materials, and which can be heated during the filling or after the filling, to an elevated temperature, sufficient to melt at least one inner layer, but not sufficient to impair the structural integrity of at least two outer layers, located at opposite surfaces of the inner layer. Upon application of a compressive force, a sufficient number of perforations are sealed in the inner layer to impart an increased moisture barrier to the film composition.

Thus, the invention also provides a perforated film composition, comprising at least three layers, and wherein at least one layer is a inner layer with a lower softening and/or melting temperature, as compared with the respective softening and/or melting temperatures of at least two outer layers, located at opposite surfaces of the inner layer, and where, when the film composition is exposed to an elevated temperature, the at least one inner layer softens or melts to such an extent, that upon exposure to a compression force, a sufficient number of perforations are sealed in the inner layer, to impart an increased moisture barrier to the film composition. The perforations through each layer of the film have a common center. The moisture barrier of the film composition is greater than the moisture barrier of the film composition prior to exposure to the elevated temperature and compression force. The increase in moisture barrier is due to the sealing of perforations, which in turn, decreases the amount of film surface area through which water can pass. The increase in moisture barrier can be measured using a water pressure test, such as a hydrohead water pressure test. In one aspect, the differences in moisture barriers are determined using Hydrohead Water Pressure Test ISO 1420 A1. In another aspect of the invention, the exposure to the elevated temperature and the exposure to the compression force take place simultaneously. In another aspect, the perforations are of sizes that are, individually, greater than, or equal to, 100 microns. In another aspect, the perforations are of sizes that are, individually, less than, or equal to, 1000 microns.

In another aspect of the invention, the at least one inner layer comprises a thermoplastic resin having a Vicat softening point from 20° C. to 150° C. In another aspect, the thermoplastic resin is selected from the group consisting of propylene/α-olefin interpolymers, ethylene/α-olefin interpolymers, and blends thereof. In a further aspect, the thermoplastic resin is an ethylene/α-olefin interpolymer or a blend thereof. In yet another aspect, the ethylene/α-olefin interpolymer, or blend thereof, comprises a copolymer formed from monomers selected from the group consisting of ethylene and 1-octene, ethylene and 1-butene, ethylene and 1-hexene, ethylene and 1-pentene, ethylene and 1-heptene, ethylene and propylene, ethylene and 4-methylpentene-1 and mixtures thereof. In yet another aspect, the ethylene/α-olefin interpolymer, or blend thereof, has a melt index ($I_2$) from 1 g/10 min to 100 g/10 min. In another further aspect, the ethylene/α-olefin interpolymer has a melt index from 1 to 50 grams/10 minutes, a density from 0.86 to 0.920 grams/cm³, and a molecular weight distribution, Mw/Mn, from 2 to 10.

In another aspect of the invention, at least one outer layer is a thermoplastic resin, selected from the group consisting of propylene homopolymers, propylene interpolymers, ethylene homopolymers, ethylene interpolymers, and blends thereof. 15. In a further aspect, the thermoplastic resin is an ethylene/α-olefin interpolymer, or a blend thereof. In a further aspect, the ethylene/α-olefin interpolymer, or blend thereof, comprises a copolymer formed from monomers selected from the group consisting of ethylene and 1-octene, ethylene and 1-butene, ethylene and 1-hexene, ethylene and 1-pentene, ethylene and 1-heptene, ethylene and propylene, ethylene and 4-methylpentene-1 and mixtures thereof. In yet another aspect, the ethylene/α-olefin interpolymer, or blend thereof, has a melt index ($I_2$) from 0.1 g/10 min to 100 g/10 min. In a further aspect, the ethylene/α-olefin interpolymer has a melt index from 0.2 to 50 grams/10 minutes, a density from 0.900 to 0.940 grams/cc, and a molecular weight distribution, Mw/Mn, from 1.5 to 5.

In another aspect of the invention, the film composition further comprises a layer, comprising GPPS, HIPS, ABS, SAN, nylon, styrene block copolymers, or a mixture thereof. In another aspect, the inner layer comprises a heat transfer agent.

In one aspect of the invention, each of the outer layers of the film composition is adjacent to the surface of the inner layer. In another embodiment, one or both outer layers are separated from the inner layer by one or more intervening layers. In another embodiment, the film composition contains only three layers. In another embodiment, the film composition contains only five layers. In yet another embodiment, the film composition contains more than five layers.

In another aspect, the inner layer as a Vicat softening point at least 20° C. lower than the respective softening points of the at least two outer layers. In another aspect, the inner layer as a Vicat softening point at least 30° C. lower than the respective softening points of the at least two outer layers. In yet another aspect, the moisture barrier is maintained at a pressure from 10 to 21.5 mbar, as determined by a Hydrohead Water Pressure Test (ISO 1420 A1).

The invention also provides for film compositions and packages that are perforated in designated areas, and/or that contain perforation gradients and/or particular perforation configurations. In one aspect, the package contains two or more seams, and the package contains perforations in one or more designated areas within the surface of the package. In another aspect, the perforations are localized in one or more designated areas that experience a maximum in compression force, received from a device that exerts a compression force on the surface of the package. In a further aspect, the device is a pair of vertically positioned rollers. In yet another aspect, the device is a series of two or more pairs of vertically positioned rollers.

In another aspect, the film composition of the package has an air permeability of at least about 20 m$^3$/hour. In another aspect, the film composition has a thickness from 50 microns to 250 microns. In another aspect, the package has a capacity from 1 kg to 100 kg.

In another aspect, the package comprises one or more designated areas located within one or more horizontally flat surfaces of the package. In a further aspect, the perforations are evenly spaced within the one or more designated areas. In another aspect, the perforations are at a higher density along the longitudinal midpoint of each of the one or more designated areas. In another aspect, the one or more designated areas are each located along a longitudinal midpoint of the surface of the package, and each area has a width that is less than one-half the width of the package.

The invention also provides for a method for forming a perforated film composition comprising at least three layers, said method comprising:

(a) selecting a thermoplastic polymer or polymer blend suitable for each layer;

(b) forming a blown or cast film from the thermoplastic polymers or blends, where the blown or cast film comprises at least three layers;

(c) perforating said blown or cast film to form a perforated film composition; and where at least one layer in the film is a inner layer with a lower softening and/or melting temperature, as compared with the respective softening and/or melting temperatures of at least two outer layers, located at opposite surfaces of the inner layer, and where the layers of the film have perforations with a common center; and when the film is exposed to an elevated temperature, the at least one inner layer softens or melts to such an extent, that upon exposure to a compression force, a sufficient number of perforations are sealed in the inner layer, to impart an increased moisture barrier to the film composition.

Moreover, the invention provides for a method of filling a package with powdery goods, comprising:

a) adding the powdered goods to a package of suitable capacity, to form a filled package, and where the package is formed from a perforated film composition, comprising at least three layers, and where at least one layer is an inner layer with a lower softening and/or melting temperature, as compared with the respective softening and/or melting temperatures of at least two outer layers, located at opposite surfaces of the inner layer, and where the layers of the film composition have perforations with a common center;

b) subjecting the package to a temperature sufficient to soften or partially melt the at least one inner layer;

c) subjecting the filled package to a compression force.

In another aspect, the perforations are localized in one or more designated areas of the package, and wherein the one or more designated areas experience a maximum compression force, received from a device that exerts a compression force on the surface of the package.

In another aspect, the filled package is further sealed after subjecting the package to a compression force In further aspect, the method of filling comprises securing the inventive bag to a filling spout. In yet a further aspect, a tube made of a nonwoven, as described in DE 3832673A1 (incorporated herein by reference), can be used to facilitate the removal of air during the filling process.

The invention also provides for films comprising a combination of two or more aspects or embodiments described herein.

The invention also provides for packages comprising a combination of two or more aspects or embodiments described herein.

The invention also provides for methods of forming films or packages comprising a combination of two or more aspects or embodiments described herein.

The invention also provides for methods for filling a package comprising a combination of two or more aspects or embodiments described herein.

BRIEF DESCRIPTION OF THE DRAWINGS

FIG. 2 is a plot of Gurley Permeability (sec) versus the total hole area (micrometers$^2$/inches$^2$) of perforated polyolefin films, in comparison with a porous paper bag.

DETAILED DESCRIPTION OF THE INVENTION

The invention provides for a breathable, layered film composition that can be filled effectively, under pressurized conditions, with powdery materials, and which, upon exposure to elevated temperature and applied compression force, forms a moisture barrier. The package of the invention is based on a perforated film composition, containing at least three layers (or plies), and where at least one inner layer has a lower softening and/or melting temperature, as compared with the respective softening and/or melting temperatures of at least two outer layers, located at opposite surfaces of the inner layer. The layers of the film compositions have perforations with a common center. In one embodiment, each of these outer layers is adjacent to a respective surface of the inner layer.

Figure 1:
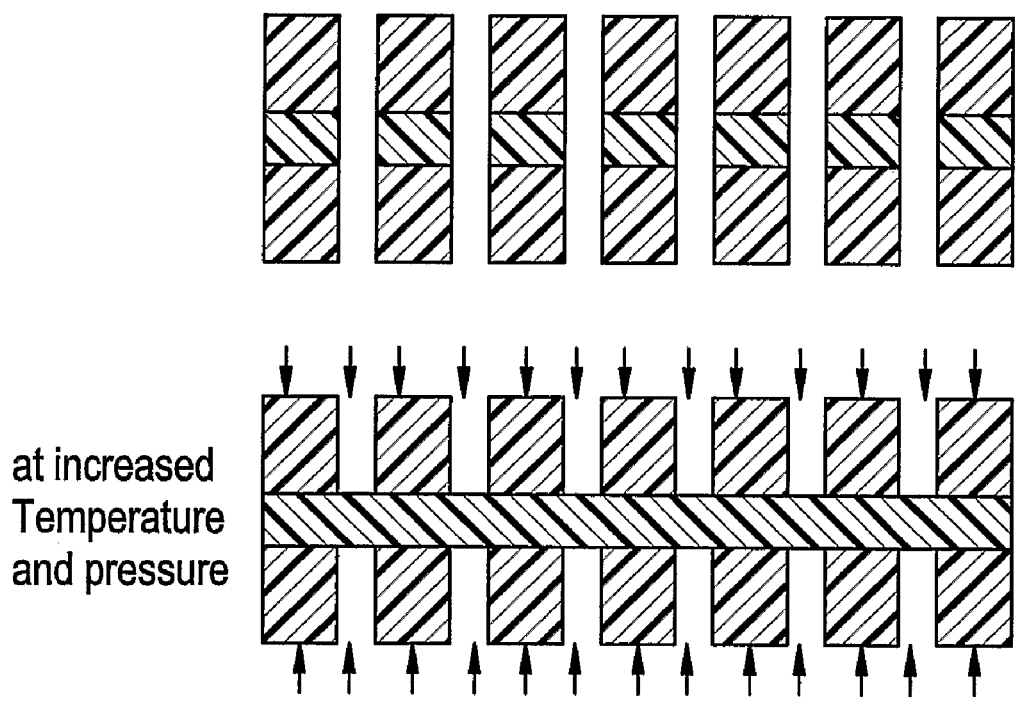
FIG. 1 is a schematic of the cross section of a film composition containing three layers, before and after application of increased temperature and pressure. The relative thickness of each film layer "before" and "after" may vary from what is depicted in FIG. 1.

Upon exposure to elevated temperature, this inner layer softens to a sufficient extent, that upon exposure to a compression force, a sufficient number of perforations are sealed in the inner layer, to impart an increase in moisture barrier to the overall film composition. This change in film configuration is depicted in FIG. 1. The increase in moisture barrier, due to the sealing of perforations, helps to prevents water, predominantly in liquid form, from passing from the exterior of the film composition to the interior of the film composition, and vise-versa. The increase in moisture barrier can be measured using a water pressure test, such as a hydrohead water pressure test. In one embodiment, the differences in moisture barriers are determined using Hydrohead Water Pressure Test ISO 1420 A1.

The thermally treated inner layer flows upon application of a compression force, to seal open perforations. This "flowability" of the material will depend, in part, on the temperature applied, the pressure applied, the thickness of the inner layer, the softening temperature and/or melting temperature of the inner layer, and/or the flow properties of the inner layer. In one embodiment, the film composition can maintain its moisture barrier and structural integrity at a pressure from 10 mbar to 21.5 mbar, in accordance with a Hydrohead Water Pressure Test (ISO 1420 A1), after being subject to thermal treatment and a compression force.

The exposure to the elevated temperature and the exposure to the compression force may occur simultaneously, or sequentially, with the temperature exposure occurring prior to the compression force. In a preferred embodiment, the film composition is exposed to a temperature of 90° C. or higher, and to a compression force of 30–60 kPa. In another embodiment, the inner layer has a Vicat softening point at least 20° C. lower than the respective softening points of at least two outer layers. In another embodiment, the inner layer has a Vicat softening point at least 30° C. lower than the respective softening points of at least two outer layers.

This invention can be applied, using different film compositions, depending on the stiffness and the maximum loading needed in the application. The use of INSPIRE™ Performance Polymers (The DOW Chemical Company), as an external layer, provides final films of higher stiffness, while the use of DOWLEX™ Polyethylene Polymers, ELITE™ Polyethylene Polymers and INSPIRE™ Polypropylene Polymers (all from The DOW Chemical Company), as an external layer, provides higher flexibility in the final film.

Packages formed from the film compositions of the invention can hold powdery goods of various sizes. In one embodiment, the particle size of such goods may range from 1 μm to 100 μm. The particle can be any shape, such as spherical or irregularly shaped and non-uniform.

The film composition of the present invention can be used for the packaging of any type of goods, including particulate, powder, granular and bulk goods, and, in particular, for the packaging of moisture sensitive goods, and moisture sensitive powdery goods. A package formed from the film composition of the invention is especially useful in the packaging of powdery goods, such as cement, lime, talc, talcum powder, polyvinyl chloride, gypsum, cocoa, corn flour, flour and powdery sugar.

The package prepared from the film composition of the invention, can be thermally or mechanically treated with additional processing steps, as required for the particular packaging needs. However, the invention provides a film composition that can be transformed upon heat and stress during routine powder packaging process steps, without the need for an additional processing step, or the alteration of a processing step. In the typical powder filling process, the heat generated during the filling of a bag can increase the bag temperature as high as 100° C. In addition, in the typical filling process, the filled bags are immediately pressed into a series of rolls for air release. Also, a package can be simultaneously subjected to both elevated temperature and compression force via air removal rolls that are heated to a specified temperature. These processing steps can effect the desired change in the film configuration, as depicted in FIG. 1.

The film composition is then breathable during the fill process, and can be used as a flexible package for difficult powder fillings. After filling, the film composition can be heated to a temperature sufficient to soften and/or melt at least one inner layer, but not sufficient to impair the structural integrity of at least two outer layers, each located at an opposite surface of the inner layer.

An increase in the temperature of the film composition may be effected by various heating mechanisms including, but are not limited to, contact heating, such as heated rollers; convection heating, such as hot air; and alternative heating sources, such as infrared (IR), microwave (MW), radio frequency (RF), and impulse heating. Some of these heating mechanisms may require one or more receptive components in one or more layers, and preferably in the inner layer. These receptors or heat transfer agents serve to absorb and transfer heat to the surrounding polymer matrix. Such materials may include polar substances or polymers (vinyl polymers, ECO polymers, siloxanes) or other substances/particles (metal, carbon black), or combinations thereof.

The film composition should be subject to an elevated temperature sufficient to soften or partially melt the inner layer, and then subject to a subsequent compression force to force the softened resin over open perforations. The compression force can be applied by feeding the film through a pair of rollers or a series of rollers (see FIG. 4). The rollers can be maintained at room temperature or heated to a certain temperature, depending on the application. At the end of such a process, a significant portion, or all of the perforations, in the inner layer are sealed, imparting an increased moisture resistant barrier on the film composition.

In one embodiment of the invention, the package may be subjected to further thermal treatment after application of the compression force to reduce the package volume.

In another embodiment of the invention, the film composition may be designed to allow for the reopening of sealed perforations, for example, upon an eternal tensile stress, or upon relaxation of an oriented core material.

In yet another embodiment, a water absorbent material may be added to the inner layer to swell the inner layer upon exposure to moisture. The swelling of the inner layer will further seal the perforations in the inner layer.

In yet another embodiment of the invention, the inner layer may contain a crosslinking group, such as a silane agent or silane grafted polymer, and, in addition, may contain a curing promoter. Upon exposure to moisture, the inner layer will crosslink to further seal the perforations in the inner layer.

The perforations within the film layers may be of any size or shape, including, but not limited to, holes of varying degrees of circularity, various triangular shapes, various rectangular shapes and other polygon shapes, irregular shapes and slits. In one embodiment of the invention, the layers (or plies) have perforations of the same size or size gradient.

The film composition may also contain at least one other film layer comprising woven (including braided) film ribbons made from a polyolefin (for example, RAFFIA polypropylene), or may also contain at least one cavitated film structure. The film composition may contain an outer polymer layer that serves as a filter to facilitate the release of air during the filling process.

In one embodiment, the film composition preferably has an air permeability of at least 20 $m^3$/hour, and preferably a Gurley permeability number (ISO test method 5636/5 titled "Paper and Board—Determination of Air Permeance (medium range)—Part 5: Gurley Method") of less than 35 seconds. The film may have a perforation density of at least 350,000 microns$^2$/inch$^2$, preferably at least 500,000 microns$^2$/inch$^2$.

The film composition may have an average number density of perforations or holes from 6 to 50 holes/inch$^2$, and, preferably, an average individual hole area of from 10,000 microns$^2$ to 70,000 microns$^2$. The size of the perforations will vary, depending on the size of the contained goods. Perforation size may range from 10 μm to 100 μm, 50 μm to 1000 μm, or higher. All individual values and subranges from 10 μm to 1000 μm are included herein and specifically disclosed herein.

The film compositions of the invention typically, may have a thickness from 25 μm (microns) to 1000 μm, preferably from 40 μm to 300 μm, more preferably from 50 μm to 250 μm. All individual values and subranges from 25 μm to 1000 μm are included herein and specifically disclosed herein. Film compositions may also have a thickness greater than 1000 μm.

In one embodiment, packages prepared from the film composition of the invention may hold a weight from 1 kg to 100 kg, preferably from 1 kg to 50 kg, or 1 to 25 kg.

Typically, the film composition contains a thermoplastic polymer. The amount of the thermoplastic polymer in the film composition will vary depending on the properties desired, for example, film strength properties, on other film components, and on the type or types of polymer employed. Generally, the amount of polyolefin in the film is at least 40 percent, preferably at least 50 percent, more preferably at least 60 percent, by weight of the total weight of the composition.

The film compositions of the invention may be used in other applications, in addition to containing powdery goods. For example, the film compositions may be used as a surface or part protecting film, which allows for easy air escape, and then provides a protected film layer after heat and pressure treatment. The film compositions of the invention may also allow punctual sealing, as the core layer passes through perforation building spots. This could be used to design a 2-plateau seal strength composition, by perforating one side of the film, or lamination of such film to a non-perforated film. The films of the invention may also be used as a lamination with non woven structure to achieve air breathability plus humidity blocking, depending on temperature. The film compositions may also contain multilayer films with different melting points for a temperature gradient composition.

Stabilizer and antioxidants may be added to a resin formulation to protect the resin from degradation, caused by reactions with oxygen, which are induced by such things as heat, light or residual catalyst from the raw materials. Antioxidants are commercially available from Ciba-Geigy, located in Hawthorn, N.Y., and include Irganox® 565, 1010 and 1076, which are hindered phenolic antioxidants. These are primary antioxidants which act as free radical scavengers, and may be used alone or in combination with other antioxidants, such as phosphite antioxidants, like Irgafos® 168, available from Ciba-Geigy. Phosphite antioxidants are considered secondary antioxidants, are not generally used alone, and are primarily used as peroxide decomposers. Other available antioxidants include, but are not limited to, Cyanox® LTDP, available from Cytec Industries in Stamford, Conn., and Ethanox® 1330, available from Albemarle Corp. in Baton Rouge, La. Many other antioxidants are available for use by themselves, or in combination with other such antioxidants. Other resin additives include, but are not limited to, ultraviolet light absorbers, antistatic agents, pigments, dyes, nucleating agents, fillers slip agents, fire retardants, plasticizers, processing aids, lubricants, stabilizers, smoke inhibitors, viscosity control agents and anti-blocking agents.

Materials for Inner and Outer Layers

The inner and outer layers may be prepared from a variety of thermoplastic polymers. The choice of resin for each layer will depend on the location of the layer, the softening and/or melting temperature of the resin, and the adhesion forces between consecutive layers.

Any thermoplastic polymer or thermoplastic polymer blend can be used in the practice of this invention, and representative polymers include the natural or synthetic resins, such as, but not limited to, styrene block copolymers; rubbers, polyolefins, such as polyethylene, polypropylene and polybutene; ethylene/vinyl acetate (EVA) copolymers; ethylene acrylic acid copolymers (EAA); ethylene acrylate copolymers (EMA, EEA, EBA); polybutylene; polybutadiene; nylons; polycarbonates; polyesters; polyethylene oxide; polypropylene oxide; ethylene-propylene interpolymers, such as ethylene-propylene rubber and ethylene-propylene-diene monomer rubbers; chlorinated polyethylene; thermoplastic vulcanates; ethylene ethylacrylate polymers (EEA); ethylene styrene interpolymers (ESI); polyurethanes; as well as functionally modified polyolefins, such as silane-graft or maleic anhydride graft-modified olefin polymers; and combinations of two or more of these polymers.

Foamed thermoplastic polymers having either open or closed cells, or a combination of both, may also be used.

The thermoplastic polymer or thermoplastic polymer blend may comprise one or more ethylene homopolymers or interpolymers as the sole polymer component or as the major polymer component. Such polymers include linear low density polyethylene (LLDPE), high density polyethylene (HDPE), low density polyethylene (LDPE), ultra low density polyethylene (ULDPE), very low density polyethylene (VLDPE), homogeneously branched linear ethylene polymers, homogeneously branched substantially linear ethylene polymers, and heterogeneous linear ethylene polymers. The amount of one or more of these polymers, if any, in a film composition, will vary depending on the properties desired, the other components, and the type polyethylene(s).

Suitable comonomers useful for polymerizing with an olefin, such as ethylene or propylene, include, but are not limited to, ethylenically unsaturated monomers, conjugated or nonconjugated dienes or polyenes. Examples of such comonomers include ethylene and the $C_3$-$C_{20}$ α-olefins, such as propylene, isobutylene, 1-butene, 1-pentene, 1-hexene, 4-methyl-1-pentene, 1-heptene, 1-octene, 1-nonene, and 1-decene. Preferred comonomers include ethylene, propylene, 1-butene, 1-hexene, 4-methyl-1-pentene and 1-octene, the latter of which is especially preferred. Other suitable monomers include styrene, halo-or-alkyl-substituted styrenes, tetrafluoroethylenes, vinylbenzocyclobutanes, butadienes, isoprenes, pentadienes, hexadienes, octadienes and cycloalkenes, for example, cyclopentene, cyclohexene and cyclooctene. Typically, ethylene is copolymerized with one $C_3$-$C_{20}$ α-olefin. Preferred comonomers include $C_3$-$C_8$ α-olefins, such as propylene, 1-butene, 1-pentene, 4-methyl-1-pentene, 1-hexene, 1-heptene, and 1-octene.

In one embodiment, an olefin-based interpolymer, useful as a film layer or as a component of a film layer, has a comonomer content that comprises not greater than 20, preferably less than 15, more preferably less than 10, most preferably less than 5 weight percent of said interpolymer. All individual weight percentages and subranges from 5 to 20 weight percent are included herein and disclosed herein.

In another embodiment, an olefin-based interpolymer, useful as a film layer or as a component of a film layer, has a comonomer content that comprises not greater than 7, preferably less than 5, more preferably less than 3, most preferably less than 2 weight percent of said interpolymer. All individual weight percentages and subranges from 2 to 7 weight percent are included herein and disclosed herein.

In another embodiment, an olefin-based interpolymer, useful as a film layer or as a component of a film layer, has a comonomer content that comprises not greater than 50, preferably less than 40, more preferably less than 30, most preferably less than 20 weight percent of said interpolymer. All individual weight percentages and subranges from 20 to 50 weight percent are included herein and disclosed herein.

In another embodiment, an olefin-based interpolymer, useful as a film layer or as a component of a film layer, has a comonomer content that comprises not greater than 20, preferably less than 10, more preferably less than 7, most preferably less than 5 weight percent of said interpolymer. All individual weight percentages and subranges from 5 to 20 weight percent are included herein and disclosed herein.

The amount of comonomer content in an interpolymer of the invention may be greater than 50 weight percent, or may be less than 2 weight percent.

Useful olefin-based interpolymers include, but are not limited to, ethylene-based interpolymers and propylene-based interpolymers.

The terms "homogeneous" and "homogeneously-branched" are used in reference to ethylene/α-olefin interpolymers, in which the α-olefin comonomer is randomly distributed within a given polymer molecule, and substantially all of the polymer molecules have the same ethylene-to-comonomer ratio.

The homogeneously branched ethylene interpolymers that can be used in the practice of this invention include homogeneously branched linear ethylene interpolymers, and homogeneously branched substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, and are made using uniform branching distribution polymerization processes, as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by Exxon Chemical Company.

The homogeneously branched substantially linear ethylene interpolymers are described in U.S. Pat. Nos. 5,272,236; 5,278,272; 6,054,544; 6,335,410, and 6,723,810 the entire contents of each are herein incorporated by reference.

In addition, the substantially linear ethylene interpolymers are homogeneously branched ethylene polymers having long chain branching. The long chain branches have the same comonomer distribution as the polymer backbone, and can have about the same length as the length of the polymer backbone. Typically, "substantially linear" means that the bulk polymer is substituted, on average, with 0.01 long chain branches per 1000 total carbons (including both backbone and branch carbons) to 3 long chain branches per 1000 total carbons. Preferred polymers are substituted with 0.01 long chain branches per 1000 total carbons, to 1 long chain branch per 1000 total carbons, more preferably from 0.05 long chain branches per 1000 total carbons to 1 long chain branch per 1000 total carbons, and especially from 0.3 long chain branches per 1000 total carbons to 1 long chain branch per 1000 total carbons.

Commercial examples of substantially linear polymers include the ENGAGE™ polymers and the AFFINITY™ polymers (both available from The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE), made, for example, using the technique disclosed by Anderson et al. in U.S. Pat. No. 4,076,698); nor are they in the same class as high pressure, free-radical initiated, highly branched, polyethylenes, such as, for example, low density polyethylene (LDPE), ethylene-acrylic acid (EAA) copolymers and ethylene vinyl acetate (EVA) copolymers.

The homogeneously branched substantially linear ethylene interpolymers useful in the invention have excellent processability, even though they have a relatively narrow molecular weight distribution. Surprisingly, the melt flow ratio according to ASTM D 1238 ($I_{10}/I_2$) of the substantially linear ethylene interpolymers can be varied widely, and essentially independently of the molecular weight distribution, $M_w/M_n$ or MWD. This surprising behavior is contrary to conventional homogeneously branched linear ethylene interpolymers, such as those described, for example, by Elston in U.S. Pat. No. 3,645,992, and heterogeneously branched conventional Ziegler-Natta polymerized linear polyethylene interpolymers, such as those described, for example, by Anderson et al. in U.S. Pat. No. 4,076,698. Unlike the homogeneously branched substantially linear ethylene interpolymers, linear ethylene interpolymers (whether homogeneously or heterogeneously branched) have rheological properties that are more influenced by the molecular weight distribution.

The homogeneously branched linear or substantially linear ethylene polymers are characterized as having a narrow molecular weight distribution ($M_w/M_n$). For the linear and substantially linear ethylene polymers, the molecular weight distribution, $M_w/M_n$, is, for example, less than or equal to 5, preferably less than or equal to 4, and more preferably from 1.5 to 4, and even more preferably from 1.5 to 3, and most preferably from 2.5 to 3.5. All individual values and subranges from 1 to 5 are included herein and disclosed herein.

The distribution of comonomer branches for the homogeneous linear and substantially linear ethylene polymers is characterized by its SCBDI (Short Chain Branch Distribution Index) or CDBI (Composition Distribution Branch Index), and is defined as the weight percent of the polymer molecules having a comonomer content within 50 percent of the median total molar comonomer content. The CDBI of a polymer is calculated from data obtained from techniques known in the art, such as, for example, temperature rising elution fractionation (abbreviated herein as "TREF"), as described, for example, by Wild et al., *Journal of Polymer Science, Poly. Phys. Ed., Vol.* 20, p. 441 (1982), or in U.S. Pat. Nos. 4,798,081 and 5,008,204. The SCBDI or CDBI for the substantially linear polymers useful in the compositions of the present invention is preferably greater than 50 percent, especially greater than 70 percent, and more preferably greater than 90 percent.

The homogeneously branched substantially linear ethylene polymers used in the film composition of the invention are known, and they, and their method of preparation, are described in, for example, U.S. Pat. Nos. 5,272,236; 5,278,272 and 5,703,187; which are each incorporated in their entirety, herein, by reference.

The homogeneous linear or substantially linear ethylene polymers may be suitably prepared using a single site catalyst. Some examples of some of these catalysts, and in particular, the constrained geometry catalysts, are disclosed in EP-A-416,815; U.S. Pat. Nos. 5,703,187; 5,872,201; U.S. EP-A-514,828; U.S. Pat. No. 6,118,013; U.S. Pat. No. 5,470,993; U.S. Pat. No. 5,374,696; U.S. Pat. No. 5,231,106; U.S. Pat. No. 5,055,438; U.S. Pat. No. 5,057,475; U.S. Pat. No. 5,096,867; U.S. Pat. No. 5,064,802 and U.S. Pat. No. 5,132,380. In U.S. application Ser. No. 720,041, filed Jun. 24, 1991, (EP-A-514,828) certain borane derivatives of the foregoing constrained geometry catalysts are disclosed, and a method for their preparation taught and claimed. In U.S. Pat. No. 5,453,410, combinations of cationic constrained geometry catalysts with an alumoxane are disclosed as suitable olefin polymerization catalysts.

The heterogeneous linear ethylene polymers can also be used in the present invention. Heterogeneous linear ethylene polymers include copolymers of ethylene and one or more $C_3$ to $C_8$ α-olefins. Homopolymers of ethylene can also be prepared using the same catalysts that are used to prepare the heterogeneous systems, such as Ziegler-Natta catalysts. Both the molecular weight distribution, and the short chain branching distribution, arising from α-olefin copolymerization, are relatively broad compared to homogeneous linear ethylene polymers. Heterogeneous linear ethylene polymers can be made in a solution, slurry, or gas phase process using a Ziegler-Natta catalyst, and are well known to those skilled in the art. For example, see U.S. Pat. No. 4,339,507, the entire contents of which is incorporated herein by reference.

Mixtures of heterogeneous and homogeneous ethylene polymers ("composite polyethylene") can also be used for the film compositions of the present invention, such as those disclosed by Kolthanuner et al. in U.S. Pat. Nos. 5,844,045; 5,869,575; and 6,448,341; the entire contents of each are incorporated herein by reference.

Inner Layer

The material of the inner layer should have a relatively low softening temperature or Vicat softening point, and/or relatively low melting temperature, compared to such temperatures of the outer layers. The material of the inner layer is typically more elastic than the material of the outer layers. Examples of suitable polymers for this layer include, but are not limited to, polyethylene-based polymers, such as, AFFINITY™ and FLEXOMER™, and polypropylene-based polymers, such as VERSIFY™ polymers (all from The DOW Chemical Company). Polymer systems other than polyofefin based systems may also be used for the inner layer. The inner layer may contain one polymer or two or more polymers, such as a polymer blend.

The specific properties of the inner layer will depend on the polymer or polymer blend used. The properties provided below are representative of polyolefin resins and other polymer resins that fall within the noted properties. The properties provided below are not intended to limit the scope of this invention, in terms of the range of polyolefins and other polymers and blends suitable for use in the invention.

In one embodiment each of the polymers described below is used in the inner layer as the sole polymer component. In another embodiment, each of the polymers described below is used in the inner layer as a polymer blend component. Such polymers may be characterized by two or more embodiments described herein.

In one embodiment, the polymer used in the inner layer, as a single component, or as a blend component, will typically be characterized by a Vicat softening point from 20° C. to 150° C., preferably from 30° C. to 120° C., more preferably from 40° C. to 110° C., and most preferably from 45° C. to 100° C. All individual values and subranges from 20° C. to 150° C. are included herein and disclosed herein. In another embodiment, the blend will typically be characterized by a Vicat softening point from 20° C. to 150° C., preferably from 30° C. to 120° C., more preferably from 40° C. to 110° C., and most preferably from 45° C. to 100° C. All individual values and subranges from 20° C. to 150° C. are included herein and disclosed herein.

In another embodiment, the polymer used in the inner layer, as a single component or as a blend component, will typically be characterized by a DSC melting point, or melting range, from 30° C. to 150° C., preferably from 40° C. to 120° C., more preferably from 50° C. to 110° C., and most preferably from 60° C. to 100° C. All individual values and subranges from 30° C. to 150° C. are included herein and disclosed herein.

In another embodiment, the polymer used in the inner layer, as a single component or as a blend component, will typically be characterized by a melt index ($I_2$), at 190° C. and 2.16 kg load (ASTM D-1238) from 1 to 1000 g/10 min, preferably from 1 to 100 g/10 min, more preferably from 1 to 50 g/10 min, even more preferably from 1 to 30 g/10 min, and most preferably from 1 to 10 g/10 min. All individual values and subranges from 1 to 1000 g/10 min are included herein and disclosed herein. In another embodiment, the blend will typically be characterized by a melt index (12), at 190° C. and 2.16 kg load (ASTM D-1238) from 1 to 1000 g/10 min, preferably from 1 to 100 g/10 min, more preferably from 1 to 50 g/10 min, even more preferably from 1 to 30 g/10 min, and most preferably from 1 to 10 g/10 min.

In another embodiment, the polymer used in the inner layer, as a single component or as a blend component, will typically be characterized by a melt flow rate (MFR), at 230°

C. and 2.16 kg load (ASTM D-1238) from 1 to 1000 g/10 min, preferably from 1 to 100 g/10 min, more preferably from 1 to 50 g/10 min, even more preferably from 1 to 30 g/10 min, and most preferably from 1 to 10 g/10 min. All individual values and subranges from 1 to 1000 g/10 min are included herein and disclosed herein. In another embodiment, the blend will typically be characterized by a melt flow rate (MFR), at 230° C. and 2.16 kg load (ASTM D-1238) from 1 to 1000 g/10 min, preferably from 1 to 100 g/10 min, more preferably from 1 to 50 g/10 min, even more preferably from 1 to 30 g/10 min, and most preferably from 1 to 10 g/10 min. All individual values and subranges from 1 to 1000 g/10 min are included herein and disclosed herein.

In another embodiment, the polymer used in the inner layer, as a single component or as a blend component, will typically be substantially amorphous, and have a total percent crystallinity of less than 50 percent, and preferably less than 30 percent, as measured by DSC.

In another embodiment, the polymer used in the inner layer, as a single component or as a blend component, will typically have a density from 0.840 g/cm$^3$ to 0.940 g/cm$^3$, and preferably from 0.860 g/cm$^3$ to 0.920 g/cm$^3$, and more preferably from 0.860 g/cm$^3$ to 0.910 g/cm$^3$. All individual values and subranges from 0.840 g/cm$^3$ to 0.940 g/cm$^3$ are included herein and disclosed herein.

In another embodiment, the polymer used in the inner layer, as a single component or as a blend component, will typically have a weight average molecular weight (Mw) from 10,000 to 200,000 g/mol, and all individual values and subranges there between are included herein and disclosed herein.

In another embodiment, the polymer used in the inner layer, as a single component or as a blend component, will typically have a molecular weight distribution, $M_w/M_n$, from 1 to 20, preferably from 1 to 10, and more preferably from 1 to 5, and even more preferably from 1.5 to 3.5. All individual values and subranges from 1 to 20 are included herein and disclosed herein.

The polymer used in the inner layer, as a single component or as a blend component, will typically be present in an amount from 50 weight percent to 100 weight percent, based on the total weight of the components of the inner layer. All individual values and subranges from 50 weight percent to 100 weight percent are included herein and disclosed herein.

The polymer used in the inner layer, as a single component or as a blend component, may have a combination of two or more properties of the above embodiments.

Outer Layer

The material of an outer layer should maintain the structural integrity of the film composition upon exposure to elevated temperatures and pressures. Suitable materials include polyethylene homopolymers and interpolmers. Typically, the material of the outer layer will have higher stiffness than the material of the inner layer. Examples of such polymers include, but are not limited to, polyethylene-based polymers, such as, DOWLEX™ and ELITE™, and polypropylene-based polymers, such as, INSPIRE™, (all from The DOW Chemical Company). Each outer layer may contain one polymer or two or more polymers, such as a polymer blend.

The specific properties of an outer layer will depend on the polymer or polymer blend used. The properties provided below are representative of polyolefin resins and other polymer resins that fall within the noted properties. The properties provided below are not intended to limit the scope of this invention, in terms of the range of polyolefins and other polymers and blends suitable for use in the invention.

In one embodiment each of the polymers described below is used in the outer layer as the sole polymer component. In another embodiment, each of the polymers described below is used in the outer layer as a polymer blend component. Such polymers may be characterized by two or more embodiments described herein.

In one embodiment, the polymer used in the outer layer, as a single component or as a blend component, will typically be characterized by a Vicat softening point from 50° C. to 230° C., preferably from 70° C. to 200° C., and more preferably from 100° C. to 150° C. All individual values and subranges from 50° C. to 230° C. are included herein and disclosed herein. In another embodiment, the blend will typically be characterized by a Vicat softening point from 50° C. to 230° C., preferably from 70° C. to 200° C., and more preferably from 100° C. to 150° C. All individual values and subranges from 50° C. to 230° C. are included herein and disclosed herein.

In another embodiment, the polymer used in the outer layer, as a single component or as a blend component, will typically be characterized by a DSC melting point from 50° C. to 250° C., preferably from 70° C. to 200° C., more preferably from 100° C. to 180° C., and even more preferably from 120° C. to 170° C. All individual values and subranges from 50° C. to 250° C. are included herein and disclosed herein.

In another embodiment, the polymer used in the outer layer, as a single component or as a blend component, will typically be characterized by a melt index ($I_2$), at 190° C. and 2.16 kg load (ASTM D-1238), from 0.1 to 100 g/10 min, preferably from 0.2 to 50 g/10 min, more preferably from 0.3 to 10 g/10 min, and even more preferably from 0.4 to 5 g/10 min. All individual values and subranges from 0.1 to 100 g/10 min are included herein and disclosed herein. In another embodiment, the blend will typically be characterized by a melt index (12), at 190° C. and 2.16 kg load (ASTM D-1238), from 0.1 to 100 g/10 min, preferably from 0.2 to 50 g/10 min, more preferably from 0.3 to 10 g/10 min, and even more preferably from 0.4 to 5 g/10 min. All individual values and subranges from 0.1 to 100 g/10 min are included herein and disclosed herein.

In another embodiment, the polymer used in the outer layer, as a single component or as a blend component, will typically be characterized by a melt flow rate, at 230° C. and 2.16 kg load (ASTM D-1238), from 0.1 to 100 g/10 min, preferably from 0.2 to 50 g/10 min, more preferably from 0.3 to 10 g/10 min, and even more preferably from 0.4 to 5 g/10 min. All individual values and subranges from 0.1 to 100 g/10 min are included herein and disclosed herein. In another embodiment, the blend will typically be characterized by a melt flow rate, at 230° C. and 2.16 kg load (ASTM D-1238), from 0.1 to 100 g/10 min, preferably from 0.2 to 50 g/10 min, more preferably from 0.3 to 10 g/10 min, and even more preferably from 0.4 to 5 g/10 min. All individual values and subranges from 0.1 to 100 g/10 min are included herein and disclosed herein.

In another embodiment, the polymer used in the outer layer, as a single component or as a blend component, will be characterized by a weight average molecular weight (Mw) from 20,000 to 1,000,000, and all individual values and subranges there between are included herein and disclosed herein.

In another embodiment, the polymer used in the outer layer, as a single component or as a blend component, will typically have a total percent crystallinity of less than 60 percent, and preferably less than 50 percent, as measured by DSC.

In another embodiment, the polymer used in the outer layer, as a single component or as a blend component, will typically have a density from 0.880 g/cm$^3$ to 0.960 g/cm$^3$, and preferably from 0.900 g/cm$^3$ to 0.940 g/cm$^3$, or 0.900 g/cm$^3$ to 0.950 g/cm$^3$. All individual values and subranges from 0.880 g/cm$^3$ to 0.960 g/cm$^3$ are included herein and disclosed herein.

In another embodiment, the polymer used in the outer layer, as a single component or as a blend component, will typically have a molecular weight distribution, $M_w/M_n$, from 1 to 20, preferably from 1 to 10, and more preferably from 1 to 5, and even more preferably from 1.5 to 3.5. All individual values and subranges from 1 to 20 are included herein and disclosed herein.

The polymer used in the outer layer, as a single component or as a blend component, will typically be present in an amount from 50 weight percent to 100 weight percent, based on the total weight of the components of the outer layer. All individual values and subranges from 50 weight percent to 100 weight percent are included herein and disclosed herein.

The polymer used in the outer layer, as a single component or as a blend component, may have a combination of two or more properties of the above embodiments.

Process for Forming the Film Compositions of the Invention

A film composition of the invention can be prepared by selecting the thermoplastic polymers suitable for making each layer; forming a film of each layer, and bonding the layers, or coextruding or casting one or more layers. The final film composition is perforated to form a breathable film. Desirably, the film layers are bonded continuously over the interfacial area between films. Perforation mechanisms include, but are not limited to, pinned rollers, plated pins and laser techniques.

For each layer, typically, it is suitable to extrusion blend the components and any additional additives, such as slip, anti-block, and polymer processing aids. The extrusion blending should be carried out in a manner, such that an adequate degree of dispersion is achieved. The parameters of extrusion blending will necessarily vary, depending upon the components. However, typically the total polymer deformation, that is, mixing degree, is important, and is controlled by, for example, the screw-design and the melt temperature. The melt temperature during film forming will depend on the film components.

After extrusion blending, a film structure is formed. Film structures may be made by conventional fabrication techniques, for example, bubble extrusion, biaxial orientation processes (such as tenter frames or double bubble processes), cast/sheet extrusion, coextrusion and lamination. Conventional bubble extrusion processes (also known as hot blown film processes) are described, for example, in *The Encyclopedia of Chemical Technology*, Kirk-Othmer, Third Edition, John Wiley & Sons, New York, 1981, Vol. 16, pp. 416-417 and Vol. 18, pp. 191-192. Biaxial orientation film manufacturing processes, such as described in the "double bubble" process of U.S. Pat. No. 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Herran et al.), U.S. Pat. No. 4,952,451 (Mueller), and U.S. Pat. Nos. 4,963,419 and 5,059,481 (both to Lustig et al.), can also be used to make the novel film structures of this invention. All of these patents are incorporated herein by reference.

Manufacturing techniques for making structures of the invention include vertical form-fill-sealing techniques, such as that described in *Packaging Machinery Operation*, Chapter 8: *Form-Fill-Sealing*, by C. Glenn Davis (Packaging Machinery Manufacturers Institute, 2000 K Street, N.W., Washington, D.C. 20006); *The Wiley Encyclopedia of Packaging Technology*, Marilyn Bakker, Editor-in-chief, pp. 364-369 (John Wiley & Sons); U.S. Pat. No. 5,288,531 (Falla et al.), U.S. Pat. No. 5,721,025 (Falla et al.), U.S. Pat. No. 5,360,648 (Falla et al.) and U.S. Pat. No. 6,117,465 (Falla et al.); other film manufacturing techniques, such as that discussed in *Plastic Films, Technology and Packaging Applications* (Technomic Publishing Co., Inc. (1992)), by Kenton R. Osborn and Wilmer A Jenkens, pp. 39-105. All of these patents and the references are incorporated herein by reference.

Other film manufacturing techniques are disclosed in U.S. Pat. No. 6,723,398 (Chum et al.). Post processing techniques, such as radiation treatment and corona treatment, especially for printing applications, can also be accomplished with the materials of the invention. Film made from the invention can also be silane cured, or the polymers used to make the inventive article can be grafted post manufacture (such as maleic anhydride grafted polymers, including techniques disclosed in U.S. Pat. No. 4,927,888 (Strait et al.), U.S. Pat. No. 4,950,541 (Tabor et al.), U.S. Pat. No. 4,762,890 (Strait et al.), U.S. Pat. No. 5,346,963 (Hughes et al.), U.S. Pat. No. 4,684,576 (Tabor et al.). All of these patents are incorporated herein by reference.

After the film composition has been formed, it can be stretched. The stretching can be accomplished in any manner, conventionally used in the art. Film compositions can be perforated and film sheets can be sent to a converter for bag manufacturing. Film sheets may be perforated using known methods of the art. The shape and size of the perforations, and the amount of perforations will depend on the final use of the film composition.

Sheets of the film composition can be bonded by heat sealing or by use of an adhesive. Heat sealing can be effected using conventional techniques, including, but not limited to, a hot bar, impulse heating, side welding, ultrasonic welding, or other alternative heating mechanisms, as discussed above.

The film compositions of the aforementioned processes may be made to any thickness depending upon the application. Typically the film compositions have a total thickness of from 5 to 300 microns, preferably from 50 to 250 microns, more preferably from 75 to 200 microns. The permeability may also be adjusted depending upon the application.

Configuration of the Perforations

The configuration of the perforations within a film composition will vary, and will depend on the final use of the film composition. Sheets of the film composition may have perforation in designated areas within the sheet. Designated areas may be of any size and shape. Within these designated areas, the perforation may exist in various configurations, including, but not limited to, perforation size gradients along a particular axis of an area, perforation density gradients along a particular axis of an area, and perforation gradients of different shapes and/or sizes.

Figure 3A:
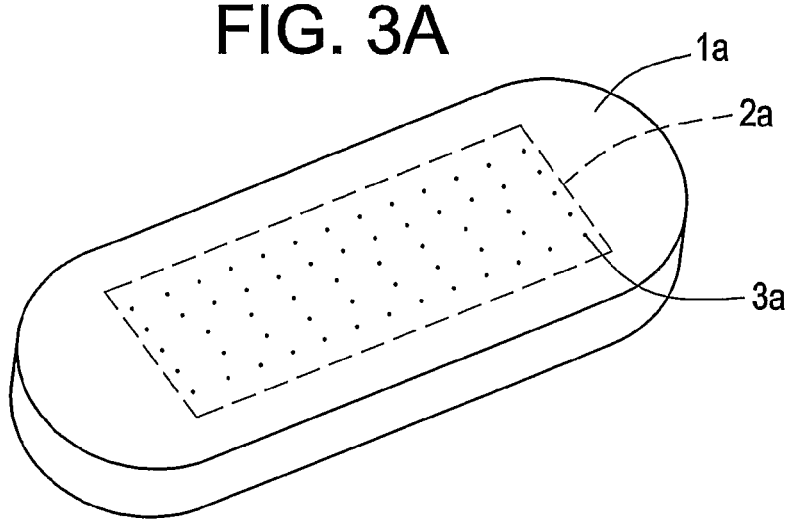
FIG. 3 is a schematic of three packages (1a, 1b, 1c), each containing a different perforation configuration (3a, 3b, 3c) in a designated area (2b, 2b, 2c).
Figure 3B:
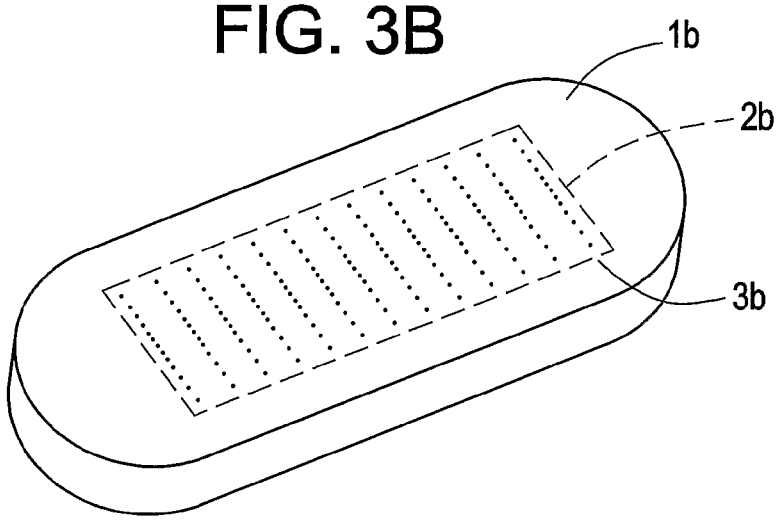
Figure 3C:
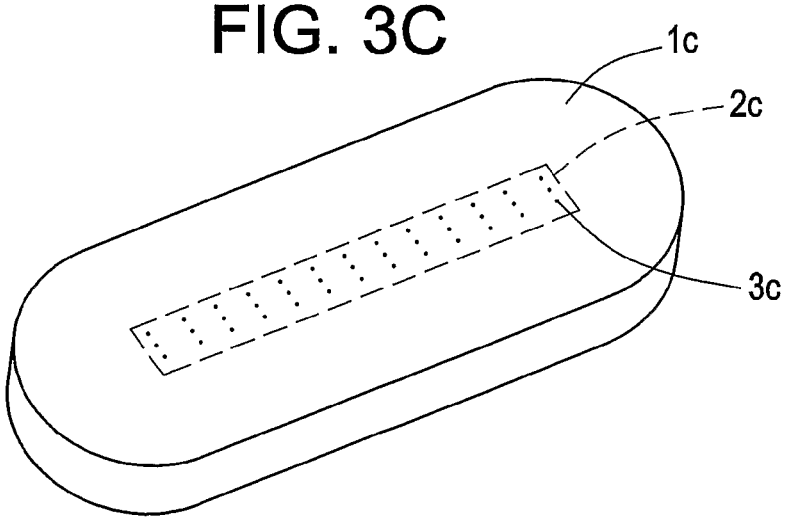

In a preferred embodiment, the film composition is perforated in a designated area. In another preferred embodiment, the film composition is perforated, such that a package, formed from such a composition, contains perforations only within one or more horizontally flat surfaces. Such a package typically contains two or more seams. In such a design, the perforations may be localized to a specified area of the package, for example, as shown in FIG. 3 (see packages 1a, 1b and 1c). As shown in FIG. 3A, the perforations (3a) may be evenly spaced with the designated area (2a), or, as shown in FIG. 3B, the perforations (3b) may be at a higher density along the longitudinal midpoint of the designated surface area (2b). In another embodiment, the perforations (3c) are aligned in a narrower area (2c), located along the longitudinal midpoint of the surface of the package, as shown in FIG. 3C. In this embodiment, the width of the designated area is considerably less than the width (w) of the container, and preferably less than one-half the width of the container. In each of these embodiments, the size and shape of the perforations may vary. Typically, the sizes of the perforations will increase as the number of perforations decrease.

Figure 4:
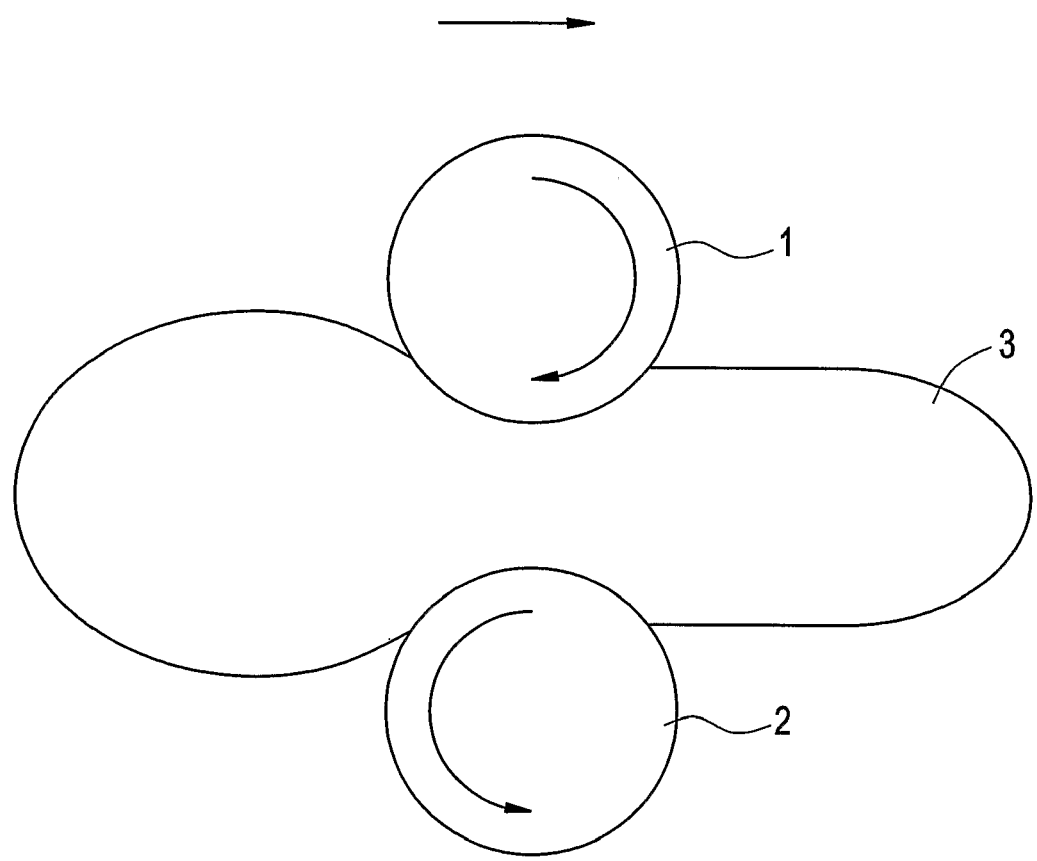
FIG. 4 is a schematic representing the application of a compressive force, using a pair of rollers (1, 2), to a package (3), formed from a film composition of the invention.

The configurations shown in FIG. 3 increase the number of perforations exposed to a maximum compression force exerted by a device, such as vertically positioned rollers, as shown in FIG. 4. As shown in FIG. 4, perforations located along the highest surface of the filled package will experience the greater amount of compression force.

Definitions

Any numerical range recited herein, include all values from the lower value to the upper value, in increments of one unit, provided that there is a separation of at least 2 units between any lower value and any higher value. As an example, if it is stated that the amount of a component, or a value of a compositional or physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. Numerical ranges have been recited, as discussed herein, in reference to Vicat softening point, DSC melting temperature, pore or perforation size, film thickness, melt index, melt flow rate, weight average molecular weight, molecular weight distribution, percent crystallinity, density, weight percent of a component, pressure, and other properties.

The term "film composition," as used herein, means a layered film structure. The term "film composition" is equivalent to the term "film," when the term "film" is in referenced to a layered film structure.

The term "composition," as used herein, includes a mixture of materials which comprise the composition, as well as reaction products and decomposition products formed from the materials of the composition.

The terms "perforations," as used herein, refers to holes made within the film composition using an impact mechanism, a laser or other device. Perforations may be of varying sizes and varying shapes.

The phrase "perforations with a common center," as used herein, refers to the common center of perforations formed in the film composition, using the same impact mechanism, laser or other device, which forms holes through all of the film layers, and also includes minor misalignments of the center of perforations within a film layer. It is noted that perforations within the layers of a film composition typically remain in place relative to other film layers; however, small shifts in the location of one or more perforations within a film layer may occur, which shift the centers of these perforations from their original positions, and destroy the alignment of perforations of the film layers. Such shifted centers are also included in the phrase "perforations with a common center."

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "thermoplastic polymer" or "thermoplastic composition" and similar terms, mean a polymer or polymer composition that is substantially thermally extrudable or deformable, albeit relatively aggressive conditions may be required.

The terms "blend" or "polymer blend," as used herein, mean a blend of two or more polymers. Such a blend may or may not be miscible. Such a blend may or may not be phase separated. Such a blend may or may not contain one or more domain configurations, as determined from transmission electron microscopy.

The term "seal," "sealed" or "sealing," as used herein in reference to perforations in an inner layer, refer to the complete or partial closure of a sufficient number of perforations in an inner layer to impart to the film composition an increased moisture barrier, as compared to the moisture barrier of the same film composition that does not have such closure.

Test Procedures

The specific test parameters within each test will depend on the polymer or polymer blend used. Some of the tests below describe test parameters that are indicated as representative of polyolefin resins. The particular parameters of a test are not intended to limit the scope of this invention. Those skilled in the art will understand the limitations of a particular set of test parameters, and will be able to determine appropriate parameters for other types of polymers and blends.

Vicat softening temperatures are measured in accordance with ASTM D1525.

The densities of the ethylene homopolymers and interpolymers, and other polyolefins are measured in accordance with ASTM D-792. Some samples are annealed at ambient conditions for 24 hours before the measurement is taken. ASTM D-792 can also be used to measure density of other polymers as noted in this test.

Melt flow rates (MFR) or melt indexes ($I_2$) of ethylene homopolymers or interpolymers are measured in accordance with ASTM D-1238, condition 190° C./2.16 kg. It is noted that for some high melt flow resins, apparent melt indexes may be determined from melt viscosity as described in U.S. Pat. Nos. 6,335,410; 6,723,810; 6,054,544. ASTM D-1238 can also be used to measure melt index of other polymers as noted in this test. The melt flow rates of propylene homopolymers and interpolymers are measured in accordance with ASTM D-1238, condition 230° C./2.16 kg.

The molecular weight distributions for the polyethylene based resins can be determined with a chromatographic system consisting of either a Polymer Laboratories Model PL-210 or a Polymer Laboratories Model PL-220. The column and carousel compartments are operated at 140° C. The columns are three Polymer Laboratories 10-micron Mixed-B columns. The solvent is 1,2,4 trichlorobenzene. The samples are prepared at a concentration of 0.1 grams of polymer in 50 milliliters of solvent. The solvent used to prepare the samples contains 200 ppm of butylated hydroxytoluene (BHT). Samples are prepared by agitating lightly for 2 hours at 160° C. The injection volume is 100 microliters and the flow rate is 1.0 milliliters/minute.

A fifth-order polynomial fit of the calibration of the gel permeation chromatography (GPC) column set, is performed with 21 narrow molecular weight distribution polystyrene standards with molecular weights ranging from 580 to 8,400,000, arranged in 6 "cocktail" mixtures, with at least a decade of separation between individual molecular weights. The standards are purchased from Polymer Laboratories (UK). The polystyrene standards are prepared at 0.025 grams in 50 milliliters of solvent for molecular weights equal to, or greater than, 1,000,000, and at 0.05 grams in 50 milliliters of solvent for molecular weights less than 1,000,000. The polystyrene standards are dissolved at 80° C. with gentle agitation for 30 minutes. The narrow standards mixtures are run first, and in order of decreasing highest molecular weight component, to minimize degradation. The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B,$$

where M is the molecular weight, A has a value of 0.4315 and B is equal to 1.0.

Polyethylene equivalent molecular weight calculations are performed using Viscotek TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=−3.721. For polypropylene-based samples, the column and carousel compartments were operated at 160° C.

Number average molecular weight, Mn, of a polymer is expressed as the first moment of a plot of the number of molecules in each molecular weight range, against the molecular weight. In effect, this is the total molecular weight of all molecules divided by the number of molecules, and is calculated in the usual manner according to the following formula:

$$Mn = \Sigma ni\, Mi/\Sigma ni = w/\Sigma(wi/Mi),$$

where
ni=number of molecules with molecular weight Mi
w=total weight of material
and Σ ni=total number of molecules Weight average molecular weight, Mw, is calculated in the usual manner according to the following formula: Mw=Σwi*Mi, where wi* and Mi are the weight fraction and molecular weight, respectively, of the ith fraction eluting from the GPC column.

The ratio of these two molecular weight averages (Mw and Mn), the molecular weight distribution (MWD or Mw/Mn), is used herein to define the breadth of the molecular weight distribution.

Percent crystallinity for polyethylene based and polypropylene based polymers can be determined by Differential Scanning Calorimetry (DSC) using a TA Instruments Model Q1000 Differential Scanning Calorimeter. A sample of around 5 to 8 mg size is cut from the material to be tested, and placed directly in the DSC pan for analysis. For higher molecular weight materials, a thin film is normally pressed from the sample, but for some lower molecular weight samples, they may be either too sticky or flow too readily during pressing. Samples for testing may, however, be cut from plaques that are prepared, and used, for density testing. The sample is first heated at a rate of about 10° C./min to 180° C. for polyethylene polymers (230° C. for polypropylene polymers), and held isothermally for three minutes at that temperature to ensure complete melting (the first heat). Then the sample is cooled at a rate of 10° C. per minute to −60° C. for polyethylene polymers (−40° C. for polypropylene polymers), and held there isothermally for three minutes, after which, it is again heated (the second heat) at a rate of 10° C. per minute until complete melting. The thermogram from this second heat is referred to as the "second heat curve." Thermograms are plotted as watts/gram versus temperature.

The percent crystallinity in the polyethylene based polymers may be calculated using heat of fusion data, generated in the second heat curve (the heat of fusion is normally computed automatically by typical commercial DSC equipment, by integration of the relevant area under the heat curve). The equation for ethylene-based samples is:

% Cryst.=$(H_f \div 292\ J/g) \times 100$; and the equation for propylene-based samples is:

% Cryst.=$(H_f \div 165\ J/g) \times 100$. The "% Cryst." represents the percent crystallinity and "$H_f$" represents the heat of fusion of the polymer in Joules per gram (J/g).

The melting point(s) ($T_m$) of the polymers can be determined from the second heat curve obtained from DSC, as described above. The crystallization temperature ($T_c$) can be determined from the first cooling curve.

The films and processes of this invention, and their uses, are more fully described by the following examples. The following examples are provided for the purpose of illustrating the invention, and are not to be construed as limiting the scope of the invention.

EXPERIMENTAL

Overview

Three layer film compositions were prepared, with a low density polymer as inner layer, and a different outer (skin) layer polymer. Suitable polymers for the inner layer include, but are not limited to, AFFINITY™ or VERSIFY™ polymers. Suitable polymers for the outer layer include, but are not limited to, INSPIRE™, DOWLEX™ and ELITE™ polymers. These film compositions were prepared by blown or cast manufacturing procedures. The films were perforated with small holes in order to be breathable, and afterwards the films were heated in an oven, for different time periods, at specified temperatures. Certain films were subjected to a compression force via the use of a metal roller or a roll mill. Such force was applied just after each film was thermally treated. The pressure resistant of the each film was examined, using a water pressure test, after the films were subjected to one of the above forces.

Film composition, oven time and oven temperature, as well as roll pressure, were selected to mimic those parameters applied in the powder packaging manufacturing process. In a different packaging process, the respective parameters would be determined accordingly.

Materials

The polymeric resins used in this study are shown in Table 1. All of the resins listed, contained one or more processing additives and one or more stablizers. The A18 resin also contained slip and antiblock additives.

TABLE 1

Polymeric Resins

| Resin | Base Monomer | Density (g/cc) | MFR (g/10 min) | Melting | Vicat | Process | Co-monomer | Catalyst* |
|---|---|---|---|---|---|---|---|---|
| D20 | Ethylene | 0.92 | 1 | 122° C. | 107° C. | Solution | Octene | Z-N |
| E51 | Ethylene | 0.92 | 0.85 | 122° C. | 107° C. | Solution | Octene | CGC |
| I11 | Propylene | 0.9 | 0.4 | 164° C. | 148° C. | Gas Phase | Ethylene | CGC |
| D50 | Ethylene | 0.934 | 1.1 | — | 124° C. | Solution | Octene | CGC |
| A82 | Ethylene | 0.87 | 5 | 60° C. | 45° C. | Solution | Octene | CGC |
| A18 | Ethylene | 0.904 | 1 | 100° C. | 89° C. | Solution | Octene | CGC |
| A13 | Ethylene | 0.902 | 30 | 98° C. | 79° C. | Solution | Octene | CGC |
| A14 | Ethylene | 0.902 | 7.5 | 95-100° C. | 84-90° C. | Solution | Octene | CGC |

*CGC = Constrained Geometry Catalyst;
*Z-N = Ziegler-Natta

Film Fabrication

Representative blown and cast film compositions were formed using the following melt processing conditions, as listed in Tables 2 and 3, respectively.

TABLE 2

Blown Film - Coextrusion

| Blown film (A/B/A) structure | Extruder A | Extruder B | Extruder C | Final Film |
|---|---|---|---|---|
| Hoper 1 (main) | 60% | | 60% | |
| Blend 1 | 40% | 40% | 40% | |
| Layer thickness | 40 micron | 40 micron | 40 micron | |
| Melt temperature | 236° C. | 228° C. | 239° C. | |
| Melt Pressure | 324 bar | 201 bar | 303 bar | |
| RPM | 73 | 53 | 49 | |
| Total thickness | | | | 120 micron |
| Total Output | | | | 120 kg/h |
| Calender Speed | | | | 11.4 m/min |
| BUR | | | | 2.5 |
| Die gap | | | | 2.5 mm |

TABLE 3

Cast Film

| Cast film (A/B/A) structure | Extruder A | Extruder C | Extruder D | Final Film |
|---|---|---|---|---|
| Layer Percentage | 40% | 20% | 40% | |
| RPM | 32 | 38 | 65 | |
| Amps | 3.1 A | 0.7 A | 2.1 A | |
| Melt temperature | 231° C. | 232° C. | 234° C. | |
| Melt Pressure | 128 bar | 47 bar | 137 bar | |
| Total Thickness | | | | 100 micron |
| Total output | | | | 6.8 kg/h |
| Take off speed | | | | 4.6 m/min |
| Die gap | | | | 0.7 mm |

The compositions of blown and cast films are listed in Table 4. Component percentages are in weight percent, based on the total weight of the composition in each individual layer.

TABLE 4

Three layer films with a total thickness between 100 and 200 μm

| | A | B | A |
|---|---|---|---|
| Blown Film | | | |
| Film# 5.b | 40% E51 + 60% D20<br>40 μm | 64% D20 + 36% A82<br>40 μm | 40% E51 + 60% D20<br>40 μm |
| Film# 10.b | 40% E51 + 60% D20<br>40 μm | 100% A18<br>40 μm | 40% E51 + 60% D20<br>40 μm |
| Film# 11.b | 40% E51 + 60% D20<br>45 μm | 100% A18<br>30 μm | 40% E51 + 60% D20<br>45 μm |
| Blown Film: Alpine | | | |
| A.b | 40% E51 + 60% D20<br>40 μm | 60% D20 + 40% A82<br>40 μm | 40% E51 + 60% D20<br>40 μm |
| B.b | 40% E51 + 60% D20<br>40 μm | 100% A18<br>40 μm | 40% E51 + 60% D20<br>40 μm |
| C.b | 40% E51 + 60% D20<br>45 μm | 100% A18<br>30 μm | 40% E51 + 60% D20<br>45 μm |
| D.b | 100% I11<br>43 μm | 100% A82<br>15 μm | 100% I11<br>42 μm |
| E.b | 100% D50<br>40 μm | 100% A82<br>20 μm | 100% D50<br>40 μm |
| Cast film | | | |
| Film# 1.c | 100% I11<br>35 μm | 100% A82<br>30 μm | 100% I11<br>35 μm |
| Film# 2.c | 100% I11<br>40 μm | 100% A82<br>20 μm | 100% I11<br>40 μm |

TABLE 4-continued

Three layer films with a total thickness between 100 and 200 μm

|  | A | B | A |
|---|---|---|---|
| Film# 3.c | 100% I11<br>42.5 μm | 100% A82<br>15 μm | 100% I11<br>42.5 μm |
| Film# 4.c | 100% I11<br>45 μm | 100% A82<br>10 μm | 100% I11<br>45 μm |
| Film# 5.c | 100% I11<br>35 μm | 100% A14<br>30 μm | 100% I11<br>35 μm |
| Film# 6.c | 100% I11<br>40 μm | 100% A14<br>20 μm | 100% I11<br>40 μm |
| Film# 7.c | 100% I11<br>45 μm | 100% A13<br>10 μm | 100% I11<br>45 μm |
| Film# 8.c | 100% I11<br>40 μm | 100% A13<br>20 μm | 100% I11<br>40 μm |
| Cast Film Collin |  |  |  |
| B.c | 100% I11<br>40 μm | 100% A13<br>20 μm | 100% I11<br>40 μm |

Representative Preparation—For the blown film (Alpine) runs, resin was extruded in an Alpine laboratory line with an extruder configuration A/B/C of 40/60/40 mm screws. The die had a diameter of 200 mm, and a gap of 1.5 mm. The BUR was typically at 2.5.

The extruder conditions will vary, and will depend on the final film composition.

Perforation of the Film

A sample, 20 cm×20 cm, of each film was perforated with 100 holes, using a 20 cm×20 cm plaque of wood, in which, within each 2 cm distance, a line of 10 needles punctures was made.

The diameter of each hole was 0.6 mm for Experiment A, and 0.8 mm for Experiment B.

Thermal Treatment and Applied Force (Compression)

Experiment A: Oven+4.3 kg Metal Roller

Blown and cast film samples (20 cm×20 cm) were thermally treated in an oven at 120° C. for different time periods: 5, 10, 15 minutes. At the end of each time interval, films were pressed with a 4.3 kg heavy metal roller. Each sample was rolled 10 times over with the roller. Samples that were thermally treated, but not pressed by the roller, served as references. The estimated applied pressure per roll on the sample was about 43 kPa.

Experiment B: Roll Mill

A roll mill was used to subject film samples to adequate temperature and compression force, in order to simulate the compression behavior of a packaging line. Blown and cast film samples were cut into two pieces, and these pieces were stacked together on adjacent surfaces, and placed into the roll mill. The roll mill could not close completely on samples less than 100 μm in thickness. The roll mill had a gap of about 110 μm (on average). The temperature of the roll mill ranged from 90° C. to 120° C., and was increased by 5° C. increments. The roll mill was used to thermally treat the films, while applying a compression force used to close perforations within the film composition. The estimated pressure produced by the roll mill was 50 kPa.

Experiment C: Water Pressure Test—Hydrohead

For each study, the film samples (test surface: 100 $cm^2$) were tested with Hydrohead Equipment, in accordance with ISO 1420 A1 (pressure increase 60 mbar/min; area of 100 $cm^2$; measurement at 23° C.). The maximum water pressure for this test was 60 mbar/min, at 23° C. Each film was subjected to a steady increase in water pressure, and the pressure was recorded after three perforations within the film composition open.

Metal Roller Pressure Treatment—Perforated blown films that were thermally treated, but not subject to a compression force, via the metal roller, were able to withstand a maximum pressure of 7 mbar. Blown films, thermally treated for 10 minutes and then subject to the compression force from the 4.3 kg roller, were able to withstand a maximum pressure of 18-20 mbar (for example, Film #5.b-20 mbar; Film #10.b-18 mbar; Film #11.b-19 mbar). Thus, a bag formed from the blown film compositions of the invention, and resistant to internal pressures within the range of 18-20 mbar, should be strong enough to prevent closed perforations from reopening during normal applications. Thus, such a bag would retain its original moisture barrier, and prevent moisture ingress into the goods inside.

Results from the roll mill treatment are described below in Table 5, and the estimated melting temperatures of the film layers, and the Vicat softening point of the inner layer is shown in Table 6.

TABLE 5

Roll Mill/Hydrohead Test Results

| Blown Film | T (roll mill) | Average Recorded Pressure from Hydrohead Test (2 samples tested) |
|---|---|---|
| Film# A.b | 90° C. | 13 mbar |
|  | 95° C. | 15.5 mbar |
|  | 100° C. | 12 mbar |
| Film# B.b | 90° C. | 10.25 mbar |
|  | 95° C. | 11.75 mbar |
| Film# C.b | 90° C. | 11 mbar |
|  | 120° C. | film could not be separated, stick one to the other |
| Film# D.b | 120° C. | 23.8 mbar |
| Film# E.b | 90° C. | 19.5 mbar |
|  | 120° C. | 15.75 mbar |

TABLE 6

Estimated melting and softening temperatures

| Film structure | A T melting | B T melting | B T vicat |
|---|---|---|---|
| A.b | 120° C. | 95° C. | 82° C. |
| B.b | 120° C. | 100° C. | 90° C. |
| C.b | 120° C. | 100° C. | 90° C. |
| D.b | 160° C. | 60° C. | 45° C. |
| E.b | 140° C. | 60° C. | 45° C. |

Experiment D: Cast Film—Water Pressure Test—Hydrohead

Eight cast film compositions were thermally treated at 120° C. (oven) for 5, 10 and 15 minutes. These samples were not subject to a compression force. After each thermal treatment, the film samples were tested for maximum water pressure resistance using the Hydrohead test, as discussed above.

The pressure results, as shown in Table 7, indicate that sample perforations reopen under lower pressures, 7-9 mbar, in the absence of a compression force treatment.

TABLE 7

Pressure Results - Films treated at 120° C. (oven)

| Cast Film | Time (min) | Recorded Pressure |
| --- | --- | --- |
| Film# 1.c | 5 | 8.5 mbar |
|  | 10 | 9 mbar |
|  | 15 | 8.5 mbar |
| Film# 2.c | 5 | 7.5 mbar |
|  | 10 | 8 mbar |
|  | 15 | 8 mbar |
| Film# 3.c | 5 | 7.5 mbar |
|  | 10 | 8.5 mbar |
|  | 15 | 8 mbar |
| Film# 4.c | 5 | 7 mbar |
|  | 10 | 7.5 mbar |
|  | 15 | 7.5 mbar |
| Film# 5.c | 5 | 7.5 mbar |
|  | 10 | 7.5 mbar |
|  | 15 | 7.5 mbar |
| Film# 6.c | 5 | 7.5 mbar |
|  | 10 | 7.5 mbar |
|  | 15 | 7.5 mbar |
| Film# 7.c | 5 | 7.5 mbar |
|  | 10 | 7.5 mbar |
|  | 15 | 7.5 mbar |
| Film# 8.c | 5 | 7.5 mbar |
|  | 10 | 7.5 mbar |
|  | 15 | 7.5 mbar |

Experiment E: Cast Film—Water Pressure Test—Hydrohead

The cast film, Film #B.c (AT melting=160° C.; BT melting=100° C.; BT vicat=80° C.) was subjected to a compression force and elevated temperature (90° C. and 120° C.) using the roll mill. The pressure results, as shown in Table 8, indicate that sample perforations reopen under higher pressures, when the film is subjected to a higher temperature.

TABLE 8

Pressure Results - Films treated in roll mill

| Cast Film | T (roll mill) | Averaged Recorded Pressure (2 samples tested) |
| --- | --- | --- |
| Film# B.c | 90° C. | 18 mbar |
|  | 120° C. | 21.5 mbar |

What is claimed is:

1. A perforated film composition, comprising at least three layers, and wherein at least one layer is an inner layer with a lower softening and/or melting temperature, as compared with the respective softening and/or melting temperatures of at least two outer layers, located at opposite surfaces of the inner layer, and
   wherein, when the film composition is exposed to an elevated temperature, the at least one inner layer softens or melts to such an extent, that upon exposure to a compression force, a sufficient number of perforations are sealed in the inner layer, to impart an increased moisture barrier to the film composition, and
   wherein, the layers of the film composition have perforations with a common center, and
   wherein each of the outer layers is independently a film comprising at least one thermoplastic polymer, or independently a foamed thermoplastic polymer resin, and
   wherein the inner layer is a film comprising at least one thermoplastic polymer, or a foamed thermoplastic polymer resin.

2. The film composition of claim 1, wherein the moisture barrier of the film composition is determined using Hydrohead Water Pressure Test ISO 1420A1.

3. The film composition of claim 1, wherein each of the outer layers is adjacent to the surface of the inner layer.

4. The film composition of claim 1, wherein the at least one inner layer has a Vicat softening point at least 20° C. lower than the respective softening points of the at least two outer layers.

5. The film composition of claim 1, wherein the exposure to the elevated temperature and the exposure to the compression force take place simultaneously.

6. The film composition of claim 1, wherein the perforations are of sizes that are, individually, greater than, or equal to, 100 microns.

7. The film composition of claim 6, wherein the moisture barrier is maintained at a pressure from 10 mbar to 21.5 mbar, as determined by a Hydrohead Water Pressure Test (ISO 1420 A1).

8. The film composition of claim 1, wherein the at least one inner layer comprises a thermoplastic resin having a Vicat softening point from 20° C. to 150° C.

9. The film composition of claim 8, wherein the thermoplastic resin is selected from the group consisting of propylene/α-olefin interpolymers, ethylene/α-olefin interpolymers, and blends thereof.

10. The film composition of claim 9, wherein the thermoplastic resin is an ethylene/α-olefin interpolymer or a blend thereof.

11. The film composition of claim 10, wherein the ethylene/α-olefin interpolymer, or blend thereof, comprises a copolymer formed from monomers selected from the group consisting of ethylene and 1-octene, ethylene and 1-butene, ethylene and 1-hexene, ethylene and 1-pentene, ethylene and 1-heptene, ethylene and propylene, ethylene and 4-methyl-pentene-1 and mixtures thereof.

12. The film composition of claim 11, wherein the ethylene/α-olefin interpolymer, or blend thereof, has a melt index ($I_2$) from 1 g/10 min to 100 g/10 min.

13. The film composition of claim 10, wherein the ethylene/α-olefin interpolymer has a melt index from 1 to 50 grams/10 minutes, a density from 0.86 to 0.920 grams/cm$^3$, and a molecular weight distribution, Mw/Mn, from 2 to 10.

14. The film composition of claim 11, wherein at least one outer layer is a thermoplastic resin, selected from the group consisting of propylene homopolymers, propylene interpolymers, ethylene homopolymers, ethylene interpolymers, and blends thereof.

15. The film composition of claim 14, wherein the thermoplastic resin is an ethylene/α-olefin interpolymer, or a blend thereof.

16. The film of claim 15, wherein the ethylene/α-olefin interpolymer, or blend thereof, comprises a copolymer formed from monomers selected from the group consisting of ethylene and 1-octene, ethylene and 1-butene, ethylene and 1-hexene, ethylene and 1-pentene, ethylene and 1-heptene, ethylene and propylene, ethylene and 4-methylpentene-1 and mixtures thereof.

17. The film composition of claim 16, wherein the ethylene/α-olefin interpolymer, or blend thereof, has a melt index ($I_2$) from 0.1 g/10 min to 100 g/10 min.

18. The film composition of claim 16, wherein the ethylene/α-olefin interpolymer has a melt index from 0.2 to 50 grams/10 minutes, a density from 0.900 to 0.940 grams/cc, and a molecular weight distribution, Mw/Mn, from 1.5 to 5.

19. The film composition of claim 1, further comprising a layer, comprising GPPS, HIPS, ABS, SAN, nylon, styrene block copolymers, or a mixture thereof.

20. The film composition of claim 1, wherein the inner layer comprises a heat transfer agent.

21. A package prepared from the film composition of claim 1.

22. The package of claim 21, wherein the film composition has an air permeability of at least 20 m³/hour.

23. The package of claim 21, wherein the film composition has a thickness from 50 microns to 250 microns.

24. The package of claim 21, wherein the package has a capacity from 1 kg to 100 kg.

25. The package of claim 21, wherein the package contains two or more seams, and wherein the package contains perforations in one or more designated areas within the surface of the package.

26. The package of claim 25, wherein the perforations are localized in one or more designated areas that experience a maximum in compression force, received from a device that exerts a compression force on the surface of the package.

27. The film composition of claim 1, wherein the perforations are of sizes that are, individually, less than, or equal to, 1000 microns.

28. The package of claim 25, wherein the one or more designated areas are located within one or more horizontally flat surfaces of the package.

29. The package of claim 28, wherein the perforations are evenly spaced within the one or more designated areas.

30. The package of claim 28, wherein the package contains only one designated area that contains perforations that are at a higher density along the longitudinal midpoint of this designated area.

31. The package of claim 28, wherein the package contains only one designated area located along a longitudinal midpoint of the surface of the package, and this area has a width that is less than one-half the width of the package.

32. The package of claim 26, wherein the device is a pair of vertically positioned rollers.

33. The package of claim 26, wherein the device is a series of two or more pairs of vertically positioned rollers.

* * * * *